US012781686B2

(12) United States Patent
Marko

(10) Patent No.: US 12,781,686 B2
(45) Date of Patent: Nov. 3, 2026

(54) PNEUMATICALLY ACTUATED ENERGY GENERATOR

(71) Applicant: Matthew David Marko, Seaside Heights, NJ (US)

(72) Inventor: Matthew David Marko, Seaside Heights, NJ (US)

( * ) Notice: Subject to any disclaimer, the term of this patent is extended or adjusted under 35 U.S.C. 154(b) by 89 days.

(21) Appl. No.: 18/888,204

(22) Filed: Sep. 18, 2024

(65) Prior Publication Data

US 2026/0078714 A1 Mar. 19, 2026

(51) Int. Cl.
*F02G 1/044* (2006.01)

(52) U.S. Cl.
CPC .......... *F02G 1/044* (2013.01); *F02G 2242/40* (2013.01); *F02G 2244/50* (2013.01)

(58) Field of Classification Search
CPC .......... F02G 1/043; F02G 1/044; F02G 1/053; F02G 2242/40; F02G 2244/50; F02G 2250/09
See application file for complete search history.

(56) References Cited

U.S. PATENT DOCUMENTS 3,457,722 A * 7/1969 Vannevar ................ F02G 1/043 60/522
2020/0370503 A1* 11/2020 Notarnicola ............ F02G 1/043

FOREIGN PATENT DOCUMENTS

DE 10060137 A1 * 5/2002 ............ F02G 1/044

* cited by examiner

*Primary Examiner* — Loren C Edwards

(57) ABSTRACT

A method of operating a mechanical heat engine according to an internally reversible thermodynamic cycle may comprise four piston-cylinders, with extending connecting rods of identical stroke lengths such that three of the piston-cylinder systems have an identical bore and the fourth cylinder has a smaller bore. According to such a method, the smaller-bore piston-cylinder is connected via the piston rod to an adjacent piston-cylinder with the rods fully extended one full stroke length; and the remaining piston-cylinders are connected via the piston rod, with the rods extended less than a full stroke length.

10 Claims, 5 Drawing Sheets

PNEUMATICALLY ACTUATED ENERGY GENERATOR

FIELD OF THE INVENTION

Figure 1:
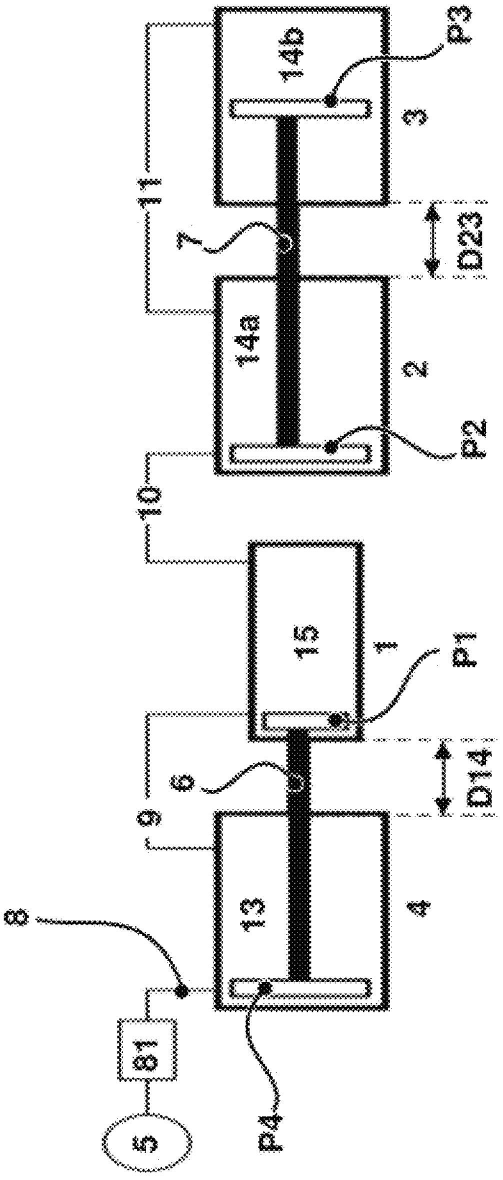

Disclosed are embodiments of the invention that relate to, among other things, a devices, systems, and methods for energy generation.

BACKGROUND

U.S. Pat. No. 10,934,971 discloses a piston-cylinder heat-pump that utilizes a novel cycle to achieve a high coefficient of performance.

U.S. Pat. No. 11,078,869 discloses a heat-engine utilizing two piston-cylinders that operate based on the intermolecular Van der Waals forces to boost the efficiency of a heat engine.

The aforementioned disclosures require a precision controller and motor-brake system to actuate the piston within the cylinder to achieve this cycle.

It may have also been demonstrated in Marko, M. D. Experimental observations of the effects of intermolecular Van der Waals force on entropy. Sci Rep 12, 7105 (2022), DOI: 10.1038/s41598-022-11093-z, that the internal energy of a real fluid (such as liquid $CO_2$ under pressure at room temperature) follows an empirical formula, such that if a real fluid were used in a heat engine, it could theoretically be used to boost the thermodynamic efficiency of a heat engine beyond that of the Carnot efficiency.

A heat engine is a machine that can accept a given heat input, and then convert a fraction of that energy into working motion, such as on a shaft for a generator, automobile, etc. The efficiency μ of this heat engine is defined as that ratio of work output $W_{out}$ (J) over the heat input $Q_{in}$ (J), $$\mu = W_{out}/Q_{in} = (Q_{in} - Q_{out})/Q_{in}.$$

The value of W is always less than the value of $Q_{in}$, and the remainder of the heat energy must be released out of the heat engine $Q_{out}$ (J) at a cooler temperature than the heat input.

As a fluid receives a heat input Q (J) at a given temperature T (K), it also receives an increase in entropy δS (J/K), δS=Q/T.

Entropy is conceptually a measure of disorder, and it is created whenever heat transfer occurs. A fluid may have an increase in entropy when it receives a heat input, and a fluid may have a decrease in entropy when it loses heat energy. Heat transfer is an irreversible process, as heat can only flow from a hotter temperature to a lower temperature due to the second law of thermodynamics; as a result, the net entropy generated to the universe $\delta S_U$ (J/K) generated by heat transfer is thus $$\delta S_U = \{(Q_{out}/T_L) - (Q_{in}/T_H)\}.$$

The greater the temperature differential during the heat transfer process, the greater the net irreversible entropy to the universe $\delta S_U$ will be. As the temperature differential shrinks to zero, the increase in entropy shrinks to zero as well, $$\text{Lim } (T_L = T_H) \rightarrow \delta S_U = 0.$$

If there are large specific masses as a source and sink, then isothermal compression and expansion are realistic, and the net increase to the universe during heat transfer are negligible.

The Carnot cycle is a theoretical cycle that represents the absolute best thermodynamic efficiency an ideal-gas working fluid can obtain with a given temperature differential. This cycle assumes the following four stages: (i) Isothermal compression of the working fluid at the cold temperature, (ii) Isentropic compression of the working fluid to the hot temperature, (iii) Isothermal expansion of the working fluid at the hot temperature, and (iv) Isentropic expansion of the working fluid back to the cold temperature.

During this cycle, all heat transfer occurs during isothermal compression and expansion, therefore the temperature differential during heat transfer is kept to a minimum, and thus there is no increase in entropy to the universe during this cycle ($\delta S_U$=0). The net efficiency uc of this heat engine is therefore, $$\delta S_U = (Q_{in}/T_H) - (Q_{out}/T_L) = 0 \rightarrow (Q_{in}/T_H) = (Q_{out}/T_L) \rightarrow (Q_{out}/Q_{in}) = (T_L/T_H)$$

$$\mu c = W/Q_{in} = (Q_{in} - Q_{out})/Q_{in} = 1 - (Q_{out}/Q_{in}) = 1 - (T_L/T_H)$$

The efficiency of μc is assuming an ideal gas working fluid. If the working fluid is a real fluid, where the intermolecular attractive Van der Waals forces are appreciable, then the molecules will be attracted to each other as the fluid forms a liquid or supercritical fluid (if above the critical temperature). With a real fluid in this cycle, the intermolecular attractive Van der Waals forces will both reduce the negative work input during the cold isothermal compression, as well as reduce the positive work output during the hot isothermal expansion. Because the intermolecular attractive Van der Waals forces are observed to be stronger at colder temperatures, using a real fluid in a Carnot cycle will allow for a greater reduction in the negative work input than the reduction in the positive work output, allowing for a net gain in work output, and thus allowing for an overall greater efficiency of this thermodynamic heat engine to exceed that of the Carnot efficiency.

SUMMARY OF THE INVENTION

In an exemplary embodiment, a thermodynamic heat engine utilizing four piston-cylinder systems and based off of the Carnot thermodynamic cycle may be employed to generate energy. According to this exemplary embodiment, one cylinder may be smaller in bore than the other cylinders (e.g., additional three (3) cylinders), and they may be arranged in two pairs of two cylinders each, with each pair of cylinders connected at the piston via a piston rod connection known to those skilled in the art. In a preferred embodiment, at least one cylinder has a smaller bore than the other cylinders.

In further accordance with this exemplary embodiment, piping and valves may allow for the working fluid to flow between cylinders, which includes both ideal gases such as air or nitrogen, as well as a real fluid liquid-gas mixture such as carbon dioxide. In one aspect of this exemplary embodiment, a smaller-bore cylinder may be wrapped in a piping system and insulated such that it is maintained at a higher temperature than the ambient while the remaining larger-bore cylinders may be exposed to the ambient environment to allow for heat transfer. Accordingly, each of the exemplary cylinders may be connected to each other via piping, which is controlled by valves. An exemplary larger-bore cylinder in accordance with this aspect of this exemplary embodiment may be connected to the smaller-bore cylinder via a connection on its non-piston-rod side via a large pneumatic reservoir (e.g., a pressure vessel). Thus, according to this exemplary embodiment, the directional flow of fluid from the large bore cylinder via this exemplary piping may be controlled by valves, such as, for example, two check-valves.

In one exemplary aspect, an exemplary energy generator in accordance with the disclosures herein may provide practical energy generation from small temperature differentials, taking advantage of the enhanced thermodynamic efficiency possible by using a real fluid subjected to temperature-dependent Van der Waals intermolecular attractive forces.

The inventor claims a heat engine that uses piston-cylinder hydraulic actuator units powered by pneumatic ideal gas to generate motive power and energy from a temperature differential. The pistons are designed such that the temperature changes of the working fluid are primarily the result of isentropic compression and expansion, increasing the efficiency. An arrangement of ball-valves and check-valves controls the timing, ensuring there are four distinct processes in every iteration of this thermodynamic cycle. A non-ideal working fluid is used in this heat engine, such that the attractive intermolecular Van der Waals forces enhances the thermodynamic efficiency of this thermodynamic heat engine to theoretically exceed that of the Carnot efficiency.

In another exemplary embodiment, an exemplary heat engine may use piston-cylinder hydraulic actuator units powered by an exemplary pneumatic ideal gas known to those skilled in the art to generate motive power and energy from a temperature differential. According to this exemplary embodiment, pistons may be designed such that the temperature changes of the working fluid are primarily the result of isentropic compression and expansion, which when acted upon by an exemplary piston during a cycle increases the energy/power output efficiency on a per piston basis and/or total piston basis. An exemplary embodiment may employ an arrangement of ball-valves and check-valves to control the timing of fluid flow among and between cylinders. In an exemplary aspect, the controlled timing of fluid flow may ensure that there are four distinct processes in every iteration of the overall thermodynamic cycles of each piston in the exemplary system. In a preferred embodiment, a non-ideal working fluid is used in such an exemplary heat engine in order to take advantage of the attractive intermolecular Van der Waals forces to enhance the thermodynamic efficiency of such an exemplary engine to either meet and/or exceed the theoretical and/or experimentally derived efficiencies of a technically similar engine cycle according to Carnot.

An exemplary method of operating a mechanical heat engine according to an internally reversible thermodynamic cycle may comprise four piston-cylinders each having at least one connecting rod of identical stroke lengths. In an exemplary method, three of the piston-cylinder systems have an identical bore and the fourth cylinder has a smaller bore. An exemplary smaller bore piston-cylinder may be connected via the piston rod to an adjacent piston-cylinder so that the rod may fully extended one full stroke length within the smaller bore cylinder. Additionally, all remaining piston-cylinders may be connected via a piston rod but not allow for the rods to extend more than a portion of the cylinder length, and in a preferred embodiment, no more than one-half of a full stroke length.

An exemplary mechanical heat engine method, like that previously described, may be configured such that the larger-bore cylinder is connected via pipes and fittings from the non-piston-rod side of the cylinder to a large pressure vessel and check valves are installed within this piping connection, so that the direction of the flow in either direction can be controlled.

An exemplary mechanical heat engine method, like any of the ones previously described, may be configured such that the larger-bore cylinder is connected via pipes and fittings from the piston-rod side of the cylinder to the piston-rod side of the rod-connected smaller-bore cylinder while being controllable with a valve.

An exemplary mechanical heat engine method, like any of the ones previously described, may be configured such that the smaller-bore cylinder is connected via pipes and fittings from the non-piston-rod side of the cylinder to the non-piston-rod side of the mechanically-detached larger-bore cylinder while being controllable with a valve.

An exemplary mechanical heat engine method, like any of the ones previously described, may be configured such that the larger-bore cylinder is connected via pipes and fittings from the piston-rod side of the cylinder to the non-piston-rod side of the rod-connected larger-bore cylinder and controllable with a valve.

An exemplary mechanical heat engine method, like any of the ones previously described, may be configured such that the smaller-bore cylinder is maintained at a hotter temperature by piping and hot-water channels surrounding the outer walls of the cylinder.

An exemplary mechanical heat engine method, like any of the ones previously described, may be configured such that the rod connecting the smaller-bore cylinder and an adjacent cylinder is connected to an electric generator.

An exemplary mechanical heat engine method, like any of the ones previously described, may be configured such that the piston on either the smaller-bore cylinder or the rod-connected larger-bore cylinder has a double piston rod that is connected to an electric generator.

An exemplary mechanical heat engine method, like any of the ones previously described, may be configured such that the mechanical heat engine at the beginning of the reversible cycle utilizes an ideal-gas-working-fluid at the ambient temperature contained: within the large pressure vessel; within the piston-rod side of the larger-bore cylinder; within the piston-rod side of larger-bore cylinder; and within the non-piston-rod side of larger-bore cylinder.

An exemplary mechanical heat engine method, like any of the ones previously described, may be configured such that the mechanical heat engine at the beginning of the reversible cycle contains non-ideal carbon dioxide within the non-piston-rod-side of the heated smaller-bore cylinder.

An exemplary mechanical heat engine method, like any of the ones previously described, may be configured such that the mechanical heat engine is actuated through the internally reversible thermodynamic cycle by the following steps: allowing the ideal-gas working fluid to flow in one direction from the compressed gas cylinder into the non-piston-rod side of the larger-bore cylinder via the direction controlled piping connection, forcing the $CO_2$ from the heated smaller-bore cylinder into the mechanically-detached larger-bore ambient temperature cylinder; closing the valve between the heated smaller-bore cylinder and the larger-bore ambient temperature cylinder, closing the direction-controlled valves between the compressed gas cylinder into the non-piston-rod side of the larger-bore cylinder, and opening the valve between ambient temperature cylinders to allow the higher-pressure ideal-gas in the non-piston-rod side of the larger-bore cylinder to flow and mix with the ideal gas contained with the piston-rod side of the larger-bore cylinder; opening the valve between the heated smaller-bore cylinder and the larger-bore ambient temperature cylinder, allowing the ambient-temperature $CO_2$ to return to the heated smaller-bore cylinder; opening the return valve of the direction-controlled piping between the compressed gas cylinder and the non-piston-rod side of the larger-bore cylinder, allowing the $CO_2$ to fully fill up the heated smaller-bore cylinder; and closing the valve between the non-piston-rod side of the larger-bore cylinder and piston-rod side of the larger-bore cylinder, as well as closing the return valve of the direction-controlled piping between the compressed gas cylinder and the non-piston-rod side of the larger-bore cylinder.

DETAILED DESCRIPTION

According to an exemplary embodiment, a closed-loop, internally reversible, heat engine-heat pump apparatus may be designed to generate motive power from a heat reservoir and a temperature differential to the ambient. By using a real fluid in the heat engine (e.g., carbon dioxide), the thermodynamic efficiency may be boosted beyond that of the ideal-gas Carnot efficiency, yielding a greater net energy output. According to this exemplary embodiment, a system may be entirely actuated by pneumatic gas and controlled by one or more ball/check valves, which may reduce and/or eliminate the need to use precision motors or brakes to fix the piston position at different stages of the cycle.

In an exemplary embodiment illustratively provided for in FIGS. 1-4, the engine may contain four piston-cylinders 1-4 that may be actuated by pneumatic ideal gas, which comes from a large high-pressure compressed gas cylinder 5. According to this exemplary embodiment, each piston-cylinder 1-4 may be a hydraulic actuator, comprising fitting/rod 6 to connect the piston P4 of cylinder 4 to the piston P1 of cylinder 1. Additionally or alternatively, an exemplary fitting/rod 7 may interconnect piston P2 of cylinder 2 to piston P3 of cylinder 3. As illustratively provided, an exemplary cylinder 1 may have a smaller bore than either of cylinders 2-4. In a preferred embodiment, cylinders 2-4 may be identically sized. Thus, in an exemplary embodiment, P1 may be smaller than P2-3. In a preferred embodiment P2, P3, and P4 pistons are substantially identical in size.

According to this exemplary embodiment, cylinder 1 and cylinder 4 may be disposed vis-à-vis one another a distance D14 such that each of pistons P1 and P4 contained therein may accomplish a full stroke of those cylinders. According to this exemplary embodiment, cylinder 2 and cylinder 3 may be disposed vis-à-vis one another a distance D23 whereby their respective pistons P2 and P3 may only achieve half a stroke length in displacement within either cylinder ⅔. It may be contemplated that the efficiencies to be achieved herein may not require such specific strokes for the cylinders 1-4, and it may be that for a given fitting/rod 6 and 7 of approximately equal length, distance D14 may only need to be greater than distance D23 to achieve the benefits herein described. In a preferred embodiment, distance D14 may be twice the distance D23.

Referring again to FIGS. 1-4, each cylinder 1-4 may be pneumatically interconnected to one another and/or the compressed gas cylinder 5 via a pipe/valve network represented by lines 8-11. A preferred embodiment of such pipe/valve networks 8-11 may be further understood with reference to FIGS. 5-8. Additionally, an exemplary network 8 interconnecting cylinder 4 to cylinder 5 may also contain a directional control check valve 81 known to those skilled in the art. In an exemplary embodiment, an exemplary check valve 81 may control flow in each direction through the network 8. As illustrated in the FIGS. 1-4, an exemplary network 8 may be established between the cylinder 5 and cylinder 4 at a location within an exemplary cylinder 4 that is downstream of the compression stroke direction of P4. Further, an exemplary network 9 may be established between cylinder 4 at a location within exemplary cylinder 4 that is behind piston P4 and at a location in cylinder 1 that is behind piston P1. Further, an exemplary network 10 may be established between cylinder 1 and cylinder 2 at a location within exemplary cylinder 1 that is forward of piston P1, and preferably forward of the maximum compression stroke of said piston P1, and at a location within exemplary cylinder 2 that is downstream of the compression stroke direction of P2 of cylinder 2. Further, an exemplary network 11 may be established between cylinder 2 and cylinder 3 at a location behind piston P2 of cylinder 2 and downstream of the compression stroke direction of P3 of cylinder 3.

In an exemplary embodiment, cylinder 1 may be maintained at a hotter temperature throughout the cycle while all of the other cylinders 2-4 may be maintained at approximately ambient room-temperature. As illustrated, four separate and unique working fluids may be passed through the networks 8-11 of the system disclosed herein. For example, working fluid 12, 13, and 14*a-b* may be such that they behave as ideal gases at ambient temperature in the ambient-temperature cylinders 2-5. As another example, working fluid 15 may be a real fluid, such as carbon dioxide, that may have a critical temperature comparable to the hot temperature maintained for cylinder 1.

In an exemplary method of operation according to FIG. 1, exemplary ideal-gas working fluids 12, 13, and 14 may all be in the ambient temperature cylinders 2-5 while the real fluid 15 may be contained within the non-piston P1 rod 6 side of the cylinder 1. Ideal-gas-working-fluid 12 may be entirely in the large compressed gas cylinder 5. Alternatively, an ideal-gas-working-fluid 13 may be entirely in the piston P4-rod 6 side of cylinder 4. In another embodiment, ideal-gas-working-fluid 14*a* may entirely fill the piston P2-rod 7 side of cylinder 2 and ideal-gas-working-fluid 14*b* may entirely fill the non-piston P3-rod 7 side of cylinder 3.

Figure 2:
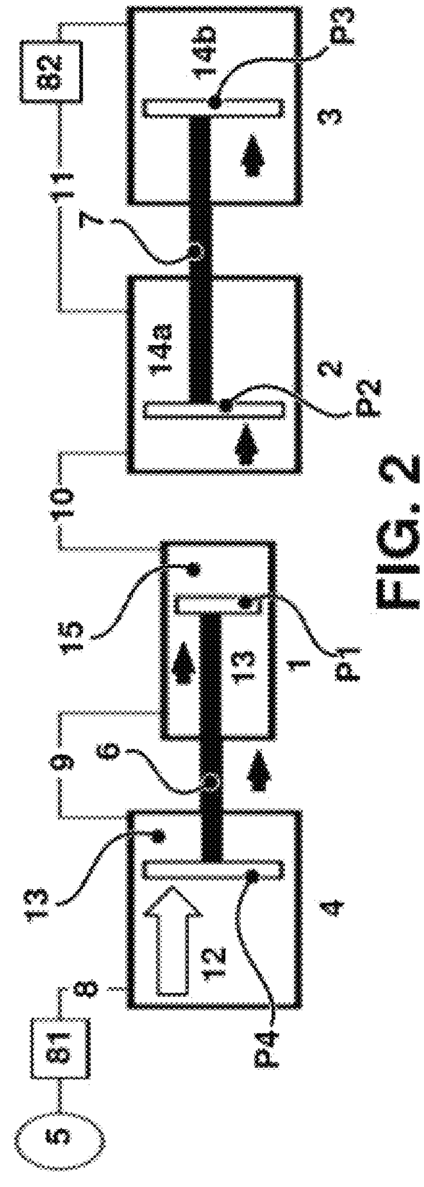

In an exemplary method of operation according to FIG. 2, ideal-gas-working-fluid 12 may be allowed by the valve to flow from the compressed gas cylinder 5 into cylinder 4 via the direction controlled piping connection 8. This may have the effect of forcing ideal-gas-working-fluid 13 from the larger cylinder 4 into the smaller-bore cylinder 1 via the piping network 9. In this exemplary step of the method, exemplary movement of the piston P4 in cylinder 4 will actuate the piston P1 in cylinder 1 via the fittings/rods 6. Accordingly, the compression of ideal-gas-working-fluid 13 from the larger cylinder 4 to the smaller cylinder 1 may compress this fluid, raising the temperature to exceed the hot temperature at which the smaller cylinder 1 may be maintained. In addition, the movement of the piston P1 in the smaller cylinder 1 may force the real-working-fluid 15 from the smaller cylinder to the larger cylinder 2 via the piping network 10. In a preferred embodiment where the real working fluid 15 is $CO_2$, the expansion of the $CO_2$, as well as the work out to actuate the larger piston in cylinder 2 may have effect of dropping the $CO_2$ temperature to that of the ambient temperature. Finally, the movement of the piston P2 in cylinder 2 may both compress the ideal-gas-working-fluid 14*a-b*, as well as actuate the movement of the piston P3 in the equal-sized cylinder 3, which may be connected via the actuator rods/fittings 7. The movement of the connected pistons P2-3 in cylinder 2 and cylinder 3 may compress the ideal-gas-working-fluid 14*a-b*. In an exemplary embodiment, ideal gas working fluid 14*a* may be contained in the equally sized cylinder 2 and ideal gas working fluid 14*b* may be contained in cylinder 3 connected pneumatically by the valve-controlled piping network 11. The pressure of the portion of ideal-gas-working-fluid 14*b* contained in the non-piston P3-rod 7 side of cylinder 3 may have a higher pressure than the pressure of the portion of ideal-gas-working-fluid 14*a* contained in the piston P2-rod 7 side of cylinder 2, due to the shorter effective volume as depicted at an exemplary first stage via FIG. 1, which may result in a greater relative compression for an equal piston actuation length.

Figure 3:
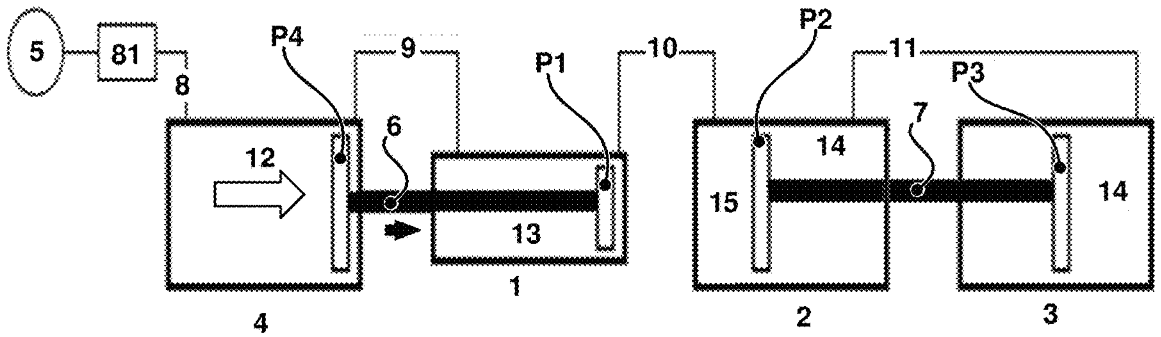

In an exemplary method of operation according to FIG. 3, a valve may control the pneumatic piping network 11 between cylinder 2 and cylinder 3, may be opened to allow flow of the ideal-gas-working-fluid 14*b* contained in cylinder 3 to flow into cylinder 2 as ideal gas working fluid 14*a* so that the total pressure equalizes. This may have the effect of compressing the real $CO_2$ working fluid 15 to the extent it may remain in the larger cylinder 2 because the piping network 10 connecting it to the smaller cylinder 1 may have a valve that may be closed. Thus, in accordance with this exemplary method step, real-working-fluid 15, such as $CO_2$, may remain at the ambient temperature but at a greater pressure. In a preferred embodiment, there may be no direction controllers on either connections between cylinders 4 and cylinder 1, cylinders 1 and cylinders 2, or cylinders 2 and cylinders 3.

Figure 4:
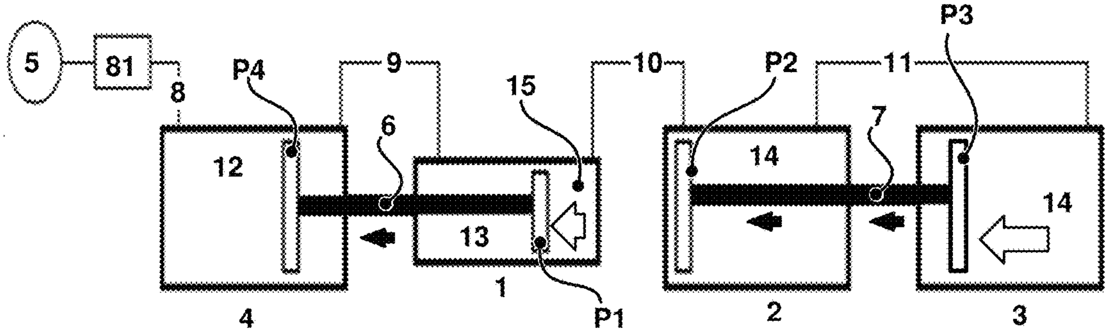

In an exemplary method of operation according to FIG. 4, the valve controlling the pneumatic piping network 10 between cylinder 1 and cylinder 2 may be opened, allowing the $CO_2$ working fluid to flow into the smaller cylinder 1 and thereby be compressed to operationally achieve a substantially isentropic temperature rise to match the temperature at which cylinder 1 may be maintained during this process.

In an exemplary embodiment by which the method depict in FIG. 4 returns to the method step illustratively provided for in FIG. 1, the valve controlling the pneumatic piping 8 between cylinder 4 and the compressed gas cylinder 5 may be opened to allow flow back to the pressure vessel, which may allow the ideal-gas-working-fluid 12 to flow back from cylinder 4 into the compressed gas cylinder 5. Consequently, ideal-gas-working-fluid 13 may flow via the piping network 9 from cylinder 1 back to cylinder 4, which may cause the fluid to expand and cool, and absorb energy from the ambient temperature walls of cylinder 4. Additionally, the real-working-fluid 15 may expand substantially isothermally in cylinder 1, resulting in an absorption of energy from the temperature source surrounding cylinder 1, which may be a heat exchanger, resistance heater, or other heat sources known to those skilled in the art. At this point, only the real-working-fluid 15 may remain in cylinder 1, all of ideal-gas-working-fluid 12 may have returned to the pressure vessel 5, all of the ideal-gas-working-fluid 13 remains in cylinder 4 at ambient temperature, and all of ideal-gas-working-fluid 14*a-b* remains within the larger bore cylinder 2 and cylinder 3 at an equal pressure. In an exemplary embodiment whereby the method configuration of FIG. 4 transitions to the configuration of FIG. 1, all of the valves of the exemplary networks 8-11 may be closed, and the cycle can repeat itself.

In a preferred embodiment, an exemplary heat engine may induce the following thermodynamic cycle to a real-working-fluid 15:

Stage 1-2 (which may be exemplified by FIGS. 1-2): simultaneous compression and expansion from a hot gas in cylinder 1 to a colder, higher-pressure gas in cylinder 2, traveling via the pneumatic connection network 10 resulting in heat energy out to the ambient surrounding cylinder 2.

Stage 2-3 (which may be exemplified by FIGS. 2-3): isothermal compression to a higher pressure in cylinder 2, resulting in heat energy out to the ambient surrounding cylinder 2.

Stage 3-4 (which may be exemplified by FIGS. 3-4): isentropic compression back to the original hot temperature while moving back from cylinder 2 to cylinder 1, traveling via the pneumatic connection network 10.

Stage 4-1 (which may be exemplified by FIGS. 1 and 4): isothermal expansion at the original hot temperature with cylinder 1 resulting in heat energy being absorbed at the hot temperature source surrounding the smaller cylinder 1.

In a preferred embodiment, an exemplary heat engine may induce the following thermodynamic cycle to an ideal-gas-working-fluid 13:

Stage 1-2 (which may be exemplified by FIGS. 1-2): compression from an ambient temperature gas in cylinder 4 to a hotter, higher-pressure ideal gas in cylinder 1, traveling via the pneumatic network 9, resulting in heat energy out to the hot temperature source surrounding cylinder 1.

Stage 2-3 (which may be exemplified by FIGS. 2-3): no change.

Stage 3-4 (which may be exemplified by FIGS. 3-4): isothermal compression at the hot temperature within cylinder 1 and thereby result in heat energy out to the hot temperature source surrounding cylinder 1.

Stage 4-1 (which may be exemplified by FIGS. 1 and 4): a combination of isentropic and isothermal expansion from the hot temperature in cylinder 1, until it may be fully returned to the larger cylinder 4 and at the ambient temperature, resulting in heat absorption from the ambient surrounding cylinder 4.

In a preferred embodiment, an exemplary heat engine may substantially maintain ideal-gas-working-fluid 12 and ideal-gas-working-fluid 14 at the ambient temperature, and all compression and expansion are effectively isothermal, given the far greater specific heat capacity of the metallic cylinder walls.

In a preferred embodiment, the following parts may be used to construct an exemplary heat engine in accordance with the disclosures provided above so that only routine engineering skill may be required to achieve the disclosed advances depicted and discussed.

Cylinder 1: a piston-cylinder hydraulic actuator, 2.5" diameter, 12" stroke, available from Norgren-Bimba of University park, Illinois (part number H-MS7-150x12-100-KK1-P15=N500-VVVV-C=2).

Cylinders 2-4: a piston-cylinder hydraulic actuator, 4" diameter, 12" stroke, available from Norgren-Bimba of University park, Illinois (part number HH-MS7-250x12-100-KK1-P15=N500-VVVV-C=2).

Working Fluids 12-14 may be air or nitrogen.

Working Fluid 15 May be Carbon Dioxide ($CO_2$)

Network 8 (which may be exemplified by FIGS. 6 and 8): Connection Cross (F-F-F-F) (McMaster-Carr Part No. 4443K654) (from McMaster-Carr of Robbinsville, New Jersey); Pressure Gauge (McMaster-Carr Part No. 3852K875-3852K9); Union Connector (to cylinder 4) (McMaster-Carr Part No. 48805K942); Nipple (½") (McMaster- Carr Part No. 48805K911); Burst disk Reducer, ½"-¼" M-M (McMaster-Carr Part No. 48805K871); Adapter (Dynapex Part No. gbu2p_04zf_u06x24f from Dynapex, LLC of Sparks, Nevada)■Burst disk (Amazon B00B7AQ3HQ); Tec (F-M-F) (McMaster-Carr Part No. 48805K195); Elbow (M-M), Quantity 2 (McMaster-Carr Part No. 48805K451); Union Connector, Quantity 2 (McMaster-Carr Part No. 48805K942); Hose, Length 12", Quantity 2 (McMaster-Carr Part No. 5793K13); Ball valve, Quantity 2 (McMaster-Carr Part No. 4118T122); Nipple (½") Quantity 2 (McMaster-Carr Part No. 48805K911); Check Valve, Quantity 2 (McMaster-Carr Part No. 4620K83); Directions in reverse, Elbow (M-M), Quantity 2 (McMaster-Carr Part No. 48805K451); Tec (F-F-F) (McMaster-Carr Part No. 48805K511); Tec (M-M-M) (McMaster-Carr Part No. 48805K129); Ball valve (McMaster-Carr Part No. 47275K43); Union Connector (McMaster-Carr Part No. 48805K942); Reducer, ½"-¼" M-M (McMaster-Carr Part No. 48805K871); Adapter to DIN (Walmart 146867723).

Network 9 (which may be exemplified by FIGS. 5 and 7): [Connection Cross (F-F-F-F) (McMaster-Carr Part No. 4443K654) (from McMaster-Carr of Robbinsville, New Jersey); Pressure Gauge (McMaster-Carr Part No. 3852K875-3852K9); Union Connector (to cylinder 4) (McMaster-Carr Part No. 48805K942); Nipple (½") (McMaster-Carr Part No. 48805K911); Burst disk Reducer, ½"-¼" M-M (McMaster-Carr Part No. 48805K871); Adapter (Dynapex Part No. gbu2p_04zf_u06x24f from Dynapex, LLC of Sparks, Nevada)■Burst disk (Amazon B00B7AQ3HQ); Nipple (½") (McMaster-Carr Part No. 48805K911); Ball valve (McMaster-Carr Part No. 47275K43); Hose, Length 12", (McMaster-Carr Part No. 5793K13); Union Connector (McMaster-Carr Part No. 48805K942); Tec (M-M-M) (McMaster-Carr Part No. 48805K129); Ball valve (McMaster-Carr Part No. 47275K43); Connection Cross (F-F-F-F) (McMaster-Carr Part No. 4443K654); Union Connector (to cylinder 1) (McMaster-Carr Part No. 48805K942); Nipple (½") (McMaster-Carr Part No. 48805K911); Burst disk Reducer, ½"-¼" M-M (McMaster-Carr Part No. 48805K871); Adapter (Dynapex Part No. gbu2p_04zf_u06x24f from Dynapex, LLC of Sparks, Nevada). Burst disk (Amazon B00B7AQ3HQ); Nipple (McMaster-Carr 48805K911); Ball Valve (McMaster-Carr 47275K43); Reducer ½-M to ⅛-F (McMaster-Carr 48805K526); 8-mm fill adapter (Amazon B07HKXV157).

Network 10 (which may be exemplified by FIG. 5): [Connection Cross (F-F-F-F) (McMaster-Carr Part No. 4443K654) (from McMaster-Carr of Robbinsville, New Jersey); Pressure Gauge (McMaster-Carr Part No. 3852K875-3852K9); Union Connector (to cylinder 4) (McMaster-Carr Part No. 48805K942); Nipple (½") (McMaster-Carr Part No. 48805K911); Burst disk Reducer, ½"-¼" M-M (McMaster-Carr Part No. 48805K871); Adapter (Dynapex Part No. gbu2p_04zf_u06x24f from Dynapex, LLC of Sparks, Nevada)■Burst disk (Amazon B00B7AQ3HQ); Nipple (½") (McMaster-Carr Part No. 48805K911); Ball valve (McMaster-Carr Part No. 47275K43); Hose, Length 12", (McMaster-Carr Part No. 5793K13); Union Connector (McMaster-Carr Part No. 48805K942); Tec (M-M-M) (McMaster-Carr Part No. 48805K129); Ball valve (McMaster-Carr Part No. 47275K43); Connection Cross (F-F-F-F) (McMaster-Carr Part No. 4443K654); Union Connector (to cylinder 1) (McMaster-Carr Part No. 48805K942); Nipple (½") (McMaster-Carr Part No. 48805K911); Burst disk Reducer, ½"-¼" M-M (McMaster-Carr Part No. 48805K871); Adapter (Dynapex Part No. gbu2p_04zf_u06x24f from Dynapex, LLC of Sparks, Nevada)■Burst disk (Amazon B00B7AQ3HQ); Nipple (McMaster-Carr 48805K911); Ball Valve (McMaster-Carr 47275K43); Reducer ½-M to ¼-F (McMaster-Carr 48805K527); ¼ NPT to CGA 320 (Amazon B06WVMF9PV).

Network 11 (which may be exemplified by FIG. 5): [Same as Network 9]

Many further variations and modifications may suggest themselves to those skilled in art upon making reference to above disclosure and foregoing interrelated and interchangeable illustrative embodiments, which are given by way of example only, and are not intended to limit the scope and spirit of the interrelated embodiments of the invention described herein.

Figure 5:
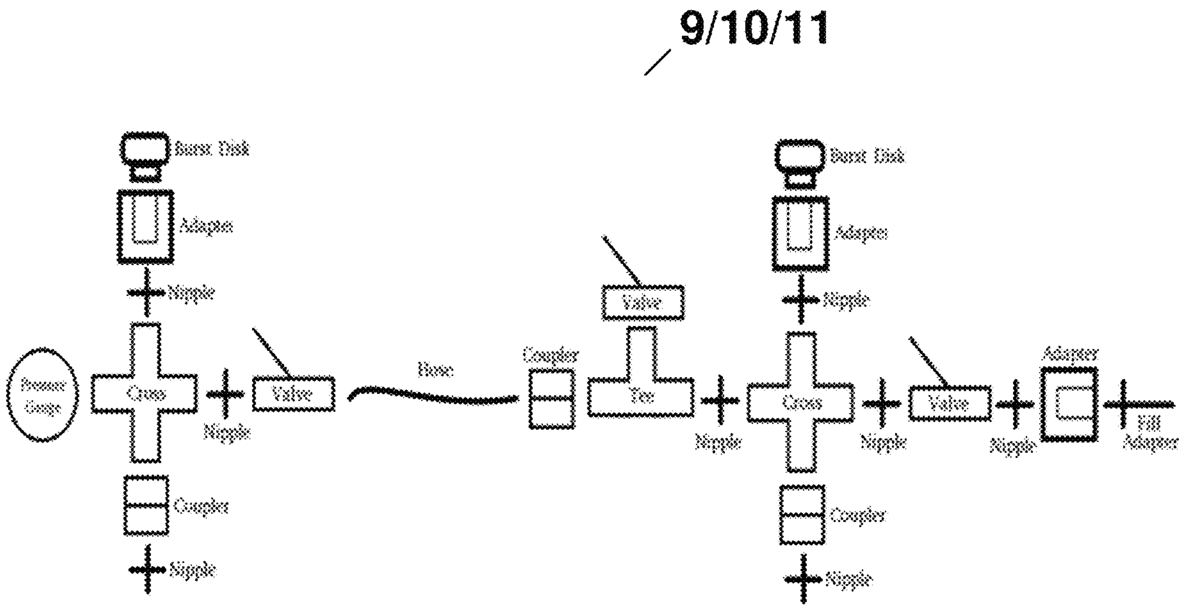
Figure 6:
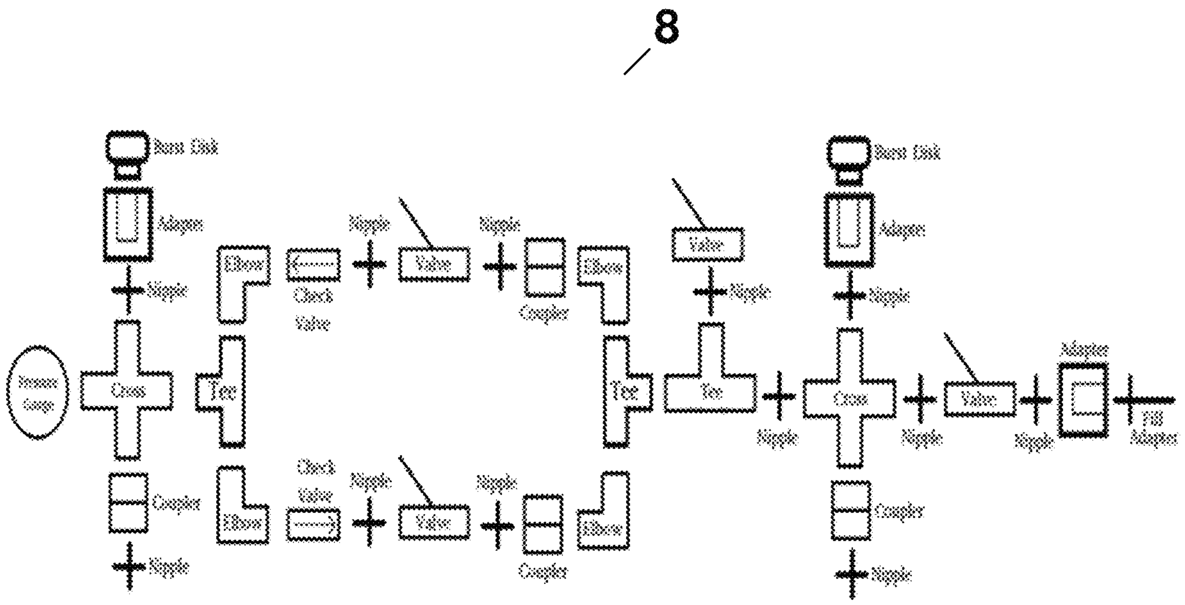
Figure 7:
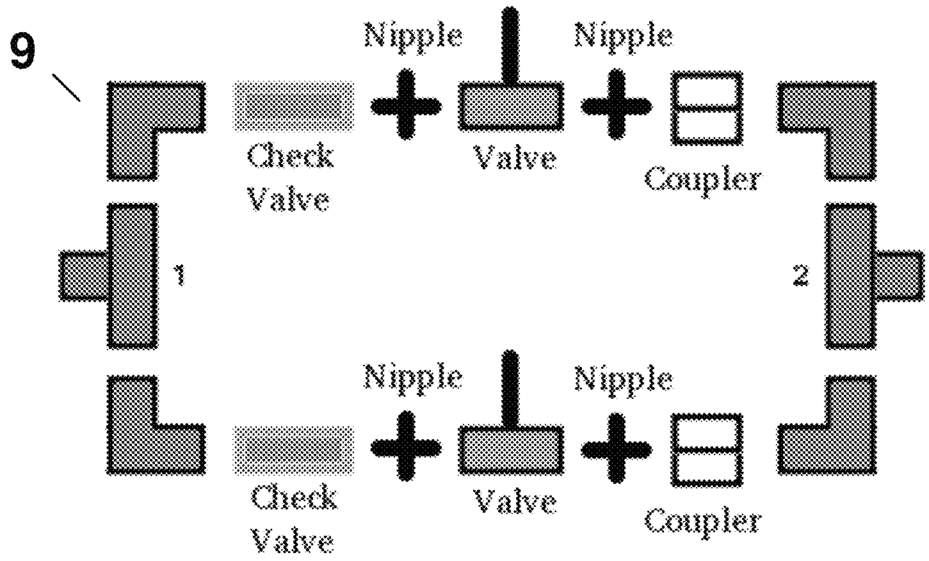
Figure 8:
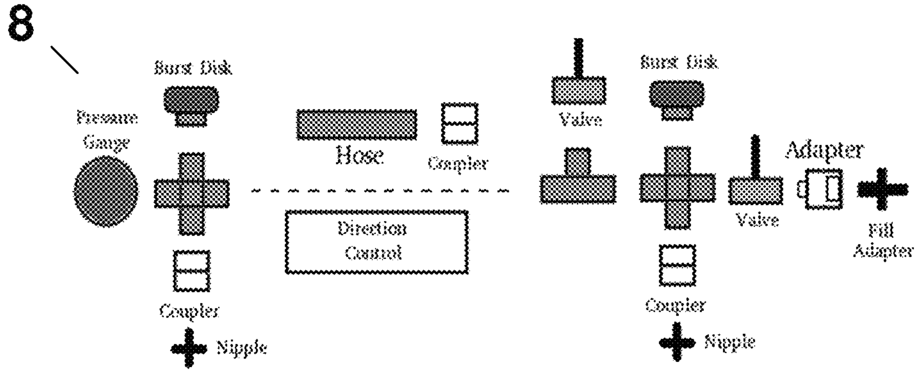

With the figures, FIG. 1 may exemplify a heat engine within Stage 1 of the described thermodynamic cycle. FIG. 2 may exemplify a heat engine that is transitioning between Stage 1 and Stage 2 of the described thermodynamic cycle. FIG. 3 may exemplify a heat engine within Stage 3 of the described thermodynamic cycle. FIG. 4 may exemplify a heat engine that is transitioning between Stage 3 and Stage 4 of the described thermodynamic cycle. FIG. 5 may exemplify Network 9, Network 10, and Network 11. FIG. 6 may exemplify Network 8. FIG. 7 may exemplify the direction-control component of Network 8. FIG. 8 may exemplify Network 8, Network 9, Network 10, and Network 11, with a comparison of the difference between Network 8 and Network 9, 10, and 11.

What is claimed is:

1. A method of operating a mechanical heat engine according to an internally reversible thermodynamic cycle, where the mechanical heat engine is actuated through the internally reversible thermodynamic cycle by the following steps:

allowing an ideal-gas working fluid to flow in one direction from a compressed gas cylinder into a non-piston-rod side of a first larger-bore cylinder of four piston-cylinders via a direction controlled piping connection, forcing CO2 from a smaller-bore cylinder of the four piston-cylinders into a mechanically detached larger-bore ambient temperature cylinder of the four piston-cylinders;

closing a valve between the smaller-bore cylinder and the mechanically detached larger-bore ambient temperature cylinder, closing direction-controlled valves between the compressed gas cylinder into the non-piston-rod side of the first larger-bore cylinder, and opening a valve between a piston-rod side of the mechanically detached larger-bore ambient temperature cylinder and a non-piston-rod side of a second larger-bore ambient temperature cylinders of the four piston-cylinders to allow a higher-pressure ideal-gas in the non-piston-rod side of the second larger-bore ambient temperature cylinder to flow and mix with ideal-gas contained with the piston-rod side of the mechanically detached larger-bore ambient temperature cylinder;

opening the valve between the smaller-bore cylinder and the mechanically detached larger-bore ambient temperature cylinder, allowing ambient-temperature CO2 to return to the smaller-bore cylinder;

opening a return valve of the direction-controlled piping connection between the compressed gas cylinder and the non-piston-rod side of the first larger-bore cylinder, allowing the ambient-temperature CO2 to fully fill up the smaller-bore cylinder; and closing the valve between the non-piston-rod side of the second larger-bore ambient temperature cylinder and the piston-rod side of the mechanically detached larger-bore ambient temperature cylinder, as well as closing the return valve of the direction-controlled piping connection between the compressed gas cylinder and the non-piston-rod side of the larger-bore cylinder.

2. The method of claim 1, wherein the mechanical heat engine comprises: the four piston-cylinders, with extending connecting rods, of identical stroke lengths; wherein the first larger-bore cylinder, the mechanically detached larger-bore ambient temperature cylinder, and the second larger-bore ambient temperature cylinder each have an identical bore, and the smaller-bore cylinder of the four piston-cylinders having a smaller bore; the smaller-bore cylinder is connected via a piston rod to the first larger-bore cylinder with the rod fully extended one full stroke length; and the mechanically detached larger-bore ambient temperature cylinder and the second larger-bore ambient temperature cylinder are connected via a second piston rod, with the second piston rod extended less than a full stroke length.

3. The method of claim 1, wherein the first larger-bore cylinder of the four piston-cylinders is connected via pipes and fittings from the non-piston-rod side of the larger-bore cylinder to the compressed gas cylinder; and check valves are installed within the pipes and fittings, such that the one direction of the flow of the ideal-gas working fluid is controlled.

4. The method of claim 1, wherein the first larger-bore cylinder of the four piston-cylinders is connected via pipes and fittings from a piston-rod side of the first larger-bore cylinder to a piston-rod side of the smaller-bore cylinder, controllable with a valve between the piston-rod side of the first larger-bore cylinder and the piston-rod side of the smaller-bore cylinder.

5. The method of claim 1, wherein the smaller-bore cylinder is connected via pipes and fittings from a non-piston-rod side of the smaller-bore cylinder to the non-piston-rod side of the mechanically-detached larger-bore ambient temperature cylinder, controllable with the valve between the smaller-bore cylinder and the mechanically detached larger-bore ambient temperature cylinder.

6. The method of claim 1, wherein the mechanically detached larger-bore ambient temperature cylinder of the four piston-cylinders is connected via pipes and fittings from the piston-rod side of the mechanically detached larger-bore ambient temperature cylinder to the non-piston-rod side of the second larger-bore ambient temperature cylinder of the four piston-cylinders, controllable with the valve between the piston-rod side of the mechanically detached larger-bore ambient temperature cylinder and the non-piston-rod side of the second larger-bore ambient temperature cylinder of the four piston-cylinders.

7. The method of claim 1, wherein the smaller-bore cylinder of the four piston-cylinders is maintained at a hotter temperature by piping and hot-water channels surrounding outer walls of the smaller-bore cylinder.

8. The method of claim 1, wherein a rod connecting the smaller-bore cylinder and the first larger-bore cylinder is connected to an electric generator; or the piston in either the smaller-bore cylinder or the second larger-bore ambient temperature cylinder has a double piston rod that is connected to the electric generator.

9. The method of claim 1, wherein the mechanical heat engine at a beginning of the reversible cycle utilizes the ideal-gas-working-fluid at the ambient temperature contained: within the compressed gas cylinder; within a piston-rod side of the first larger-bore cylinder; within the piston-rod side of the mechanically detached larger-bore ambient temperature cylinder; and within the non-piston-rod side of the second larger-bore ambient temperature cylinder.

10. The method of claim 1, where the mechanical heat engine at a beginning of the reversible cycle contains non-ideal-working-fluid carbon dioxide within a non-piston-rod side of the smaller-bore cylinder.

* * * * *